US009219341B1

(12) United States Patent
O'Keefe et al.

(10) Patent No.: US 9,219,341 B1
(45) Date of Patent: Dec. 22, 2015

(54) PORTABLE APPARATUS HAVING ELECTRICAL POWER RECEPTACLES AND DEVICE CHARGING PORTS

(71) Applicant: Premier Manufacturing Group, Inc., Shelton, CT (US)

(72) Inventors: Michael O'Keefe, Wethersfield, CT (US); Michael Brandstatter, Ansonia, CT (US); David Black, Orange, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 15 days.

(21) Appl. No.: 14/293,973

(22) Filed: Jun. 2, 2014

Related U.S. Application Data

(60) Provisional application No. 61/830,882, filed on Jun. 4, 2013.

(51) Int. Cl.
*H01R 31/02* (2006.01)
*H01R 27/02* (2006.01)

(52) U.S. Cl.
CPC ............... *H01R 27/02* (2013.01); *H01R 31/02* (2013.01)

(58) Field of Classification Search
CPC ........ H01R 25/00; H01R 27/02; H01R 31/00; H01R 33/00; H01R 31/02
USPC .................................. 439/652–654, 638, 300
See application file for complete search history.

(56) References Cited

U.S. PATENT DOCUMENTS

| | | | | |
|---|---|---|---|---|
| 5,963,014 A * | 10/1999 | Chen | ............................. | 320/110 |
| 6,042,426 A * | 3/2000 | Byrne | ............................ | 439/654 |
| 6,315,593 B1 * | 11/2001 | Bentley et al. | ................ | 439/346 |
| 7,329,152 B2 * | 2/2008 | Mori et al. | ..................... | 439/638 |
| 8,002,586 B2 * | 8/2011 | Fleisig | ............................ | 439/652 |
| 9,088,088 B1 * | 7/2015 | Black et al. | ........................... | 1/1 |
| 2005/0079769 A1 * | 4/2005 | Strayer | ......................... | 439/652 |
| 2007/0275594 A1 * | 11/2007 | Greenberg | .................... | 439/501 |
| 2009/0156061 A1 * | 6/2009 | Bernstein | ...................... | 439/652 |

* cited by examiner

*Primary Examiner* — Chandrika Prasad
(74) *Attorney, Agent, or Firm* — Raymond A. Nuzzo

(57) ABSTRACT

A portable apparatus for providing electrical power receptacles and device charging ports has a bottom panel member having a top side and a bottom side. A wall structure is attached and substantially perpendicular to the top side of the bottom panel member. The wall structure defines an interior region and comprises a plurality of sections wherein each section has an opening therein. Electrical power devices are located within the interior region. Each electrical power device is attached to a corresponding section of the wall structure and has an electrical power receptacle and device charging ports that are positioned within the opening in the corresponding section of the wall structure. A top panel member covers the interior region defined by the wall structure. The wall structure is attached to the top panel member. An electrical power cable is electrically connected to all of the electrical power devices.

18 Claims, 16 Drawing Sheets

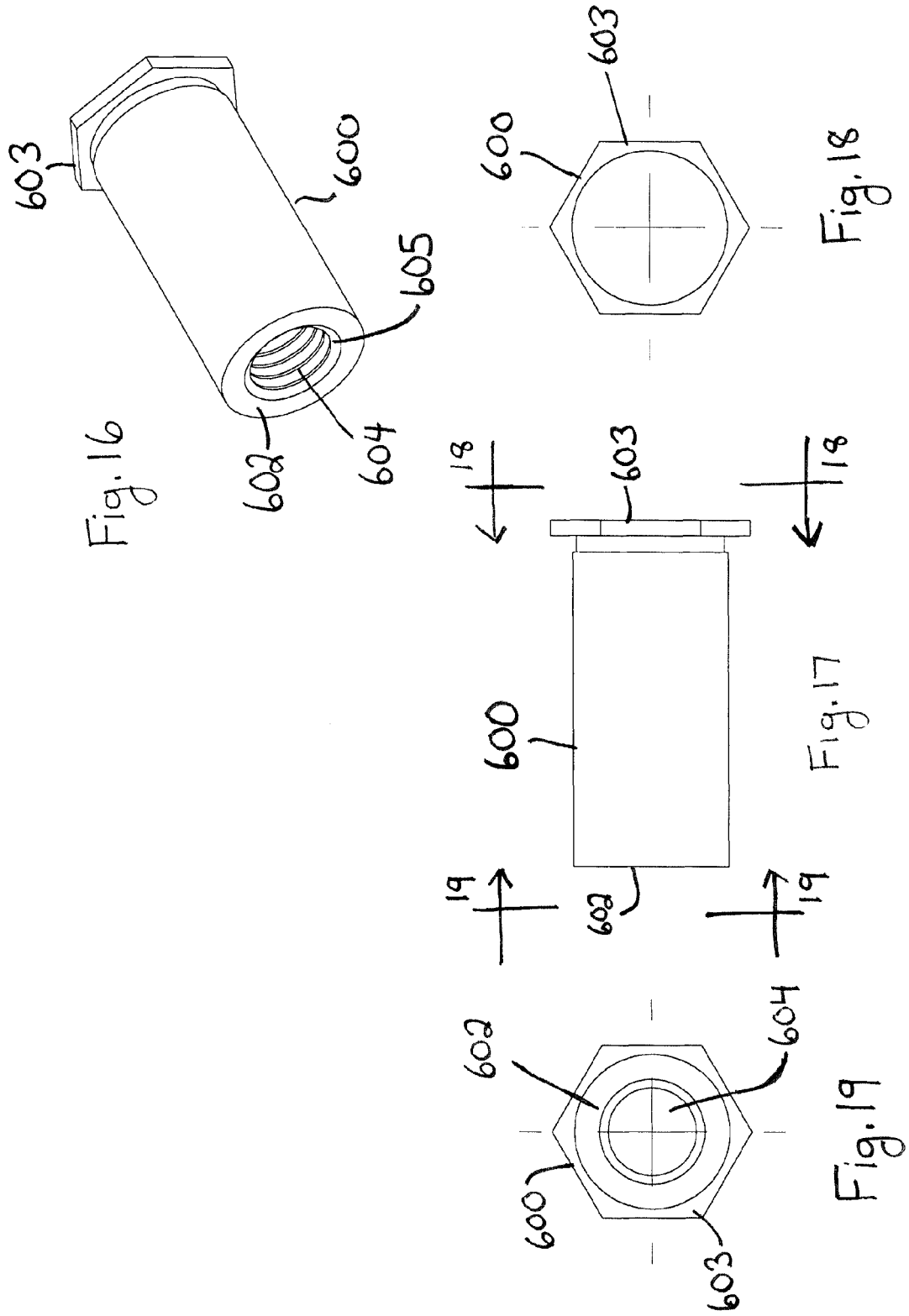

PORTABLE APPARATUS HAVING ELECTRICAL POWER RECEPTACLES AND DEVICE CHARGING PORTS

CROSS-REFERENCE TO RELATED APPLICATIONS

This application claims the benefit of the filing date of U.S. provisional patent application No. 61/830,882, filed Jun. 4, 2013. The entire disclosure of U.S. application No. 61/830,882 is hereby incorporated by reference.

BACKGROUND (1) Field of the Invention

The present invention relates to a portable apparatus for providing electrical power receptacles and device charging ports.

(2) Description of the Prior Art

Apparatuses and devices that provide electrical power receptacles are known in the art. Examples of such apparatuses and devices are disclosed in U.S. Pat. Nos. Des. 372,018, Des. 389,459, 6,042,426 and 7,760,516.

SUMMARY

It is an object of the present invention to provide a portable apparatus that provides electrical power receptacles and device charging ports.

In one aspect, the present invention is directed to a portable apparatus for providing electrical power receptacles and device charging ports, comprising a bottom panel member having a top side, a bottom side and a through-hole for receiving an electrical power cable. The portable apparatus further comprises a wall structure attached and substantially perpendicular to the top side of the bottom panel member. The wall structure defines an interior region. In one embodiment, the wall structure comprises three sections wherein each section has an opening therein. The portable apparatus includes a plurality of electrical power devices located within the interior region defined by the wall structure. Each electrical power device is attached to a corresponding section of the wall structure. Each electrical power device comprises at least one electrical power receptacle and at least one device charging port. The electrical power receptacle and device charging port are positioned within the opening in the corresponding section of the wall structure. The portable apparatus further comprises a top panel member positioned over the wall structure so as to cover the interior region defined by the wall structure. The top panel member has a top side and a bottom side. The wall structure is attached to bottom side of the top panel member. The portable apparatus further comprises an electrical power cable having a first portion that extends through the through-hole in the bottom panel member and is electrically connected to all of the electrical power devices. The electrical power cable includes a second portion that is configured for connection to an electrical power source.

Other objects and advantages of the present invention will be apparent from the ensuing description, claims and accompanying drawings.

BRIEF DESCRIPTION OF THE DRAWINGS

FIG. 16 is a perspective view of a fastener device shown in FIGS. 10-15;

FIG. 17 is a side view of the fastener device;

FIG. 18 is an end view taken along line 18-18 in FIG. 17; and

FIG. 19 is an end view taken along line 19-19 in FIG. 17.

DESCRIPTION OF ILLUSTRATIVE EMBODIMENTS

Figure 1:
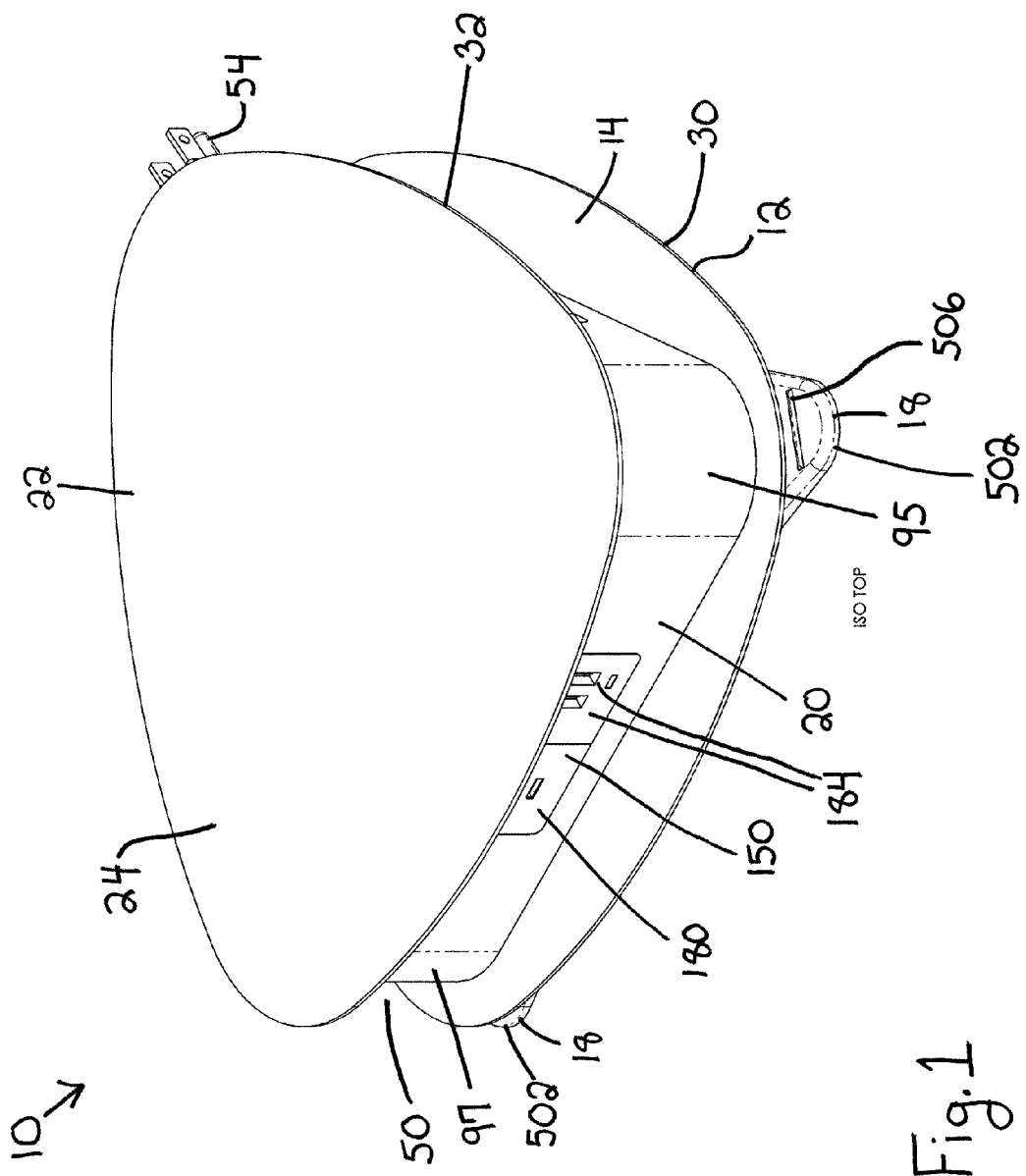
FIG. 1 is a top perspective view of a portable apparatus for providing electrical power receptacles and device charging ports in accordance with one embodiment of the present invention.
Figure 2:
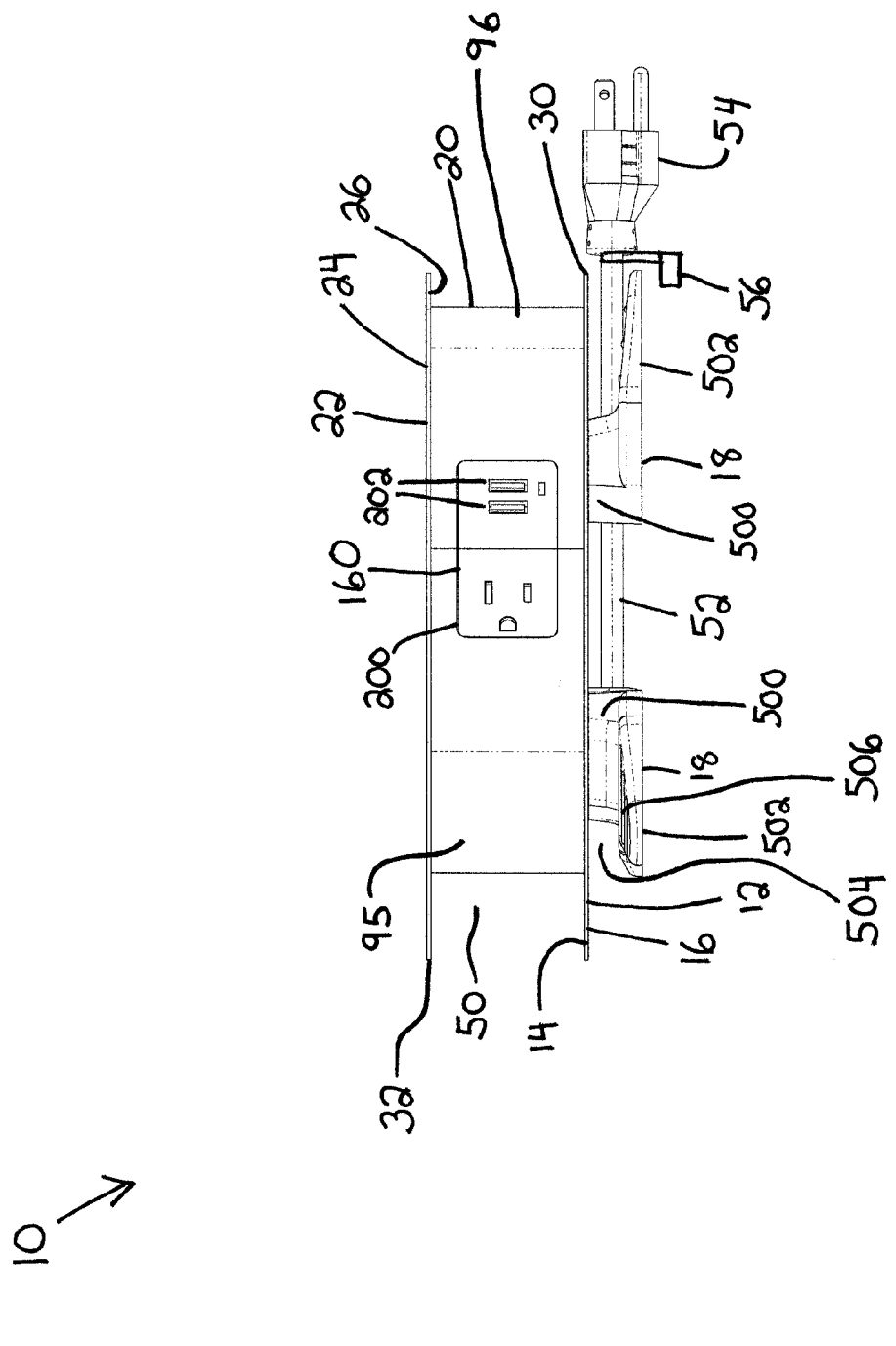
FIG. 2 is a front elevational view thereof.
Figure 3:
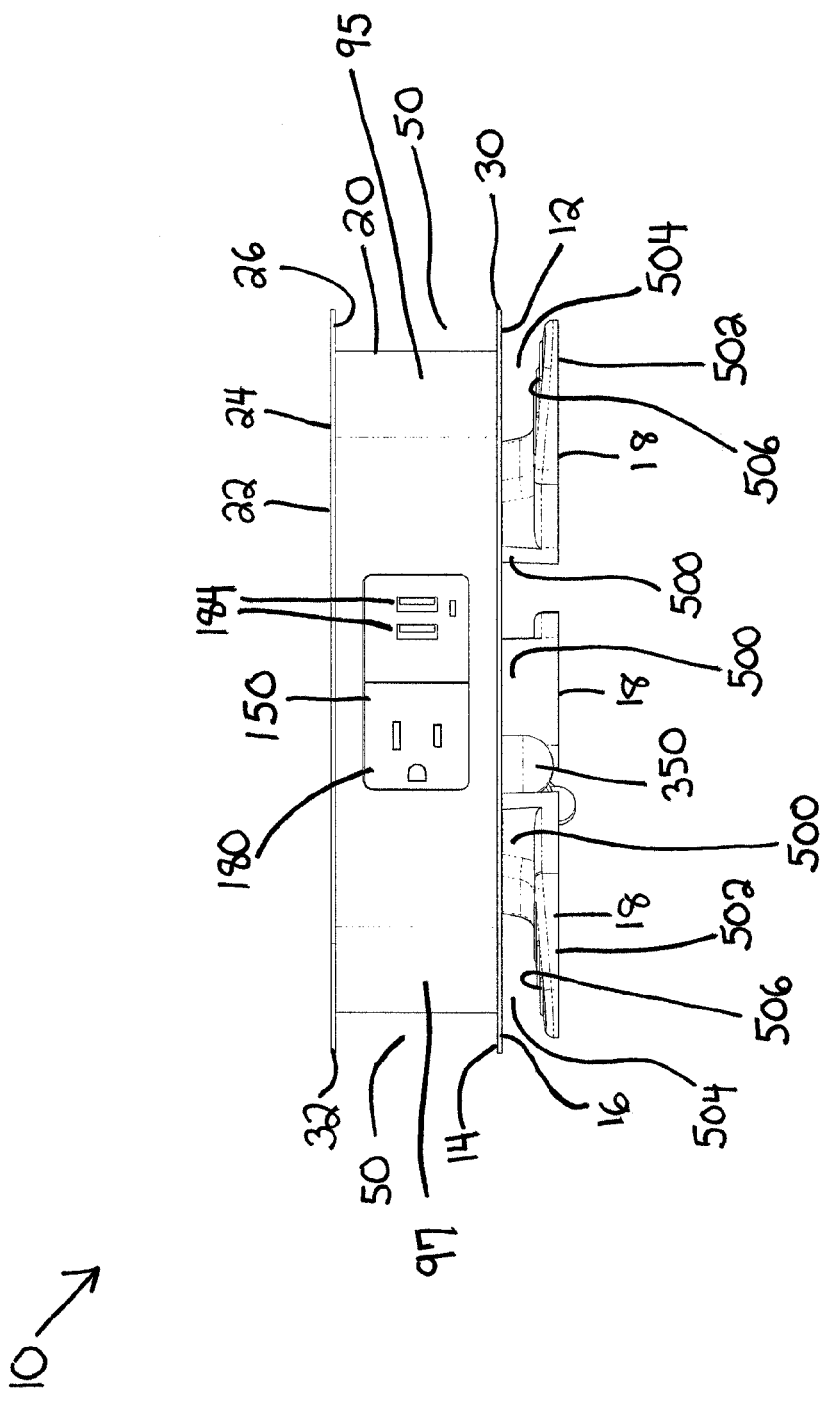
FIG. 3 is rear elevational view thereof.
Figure 4:
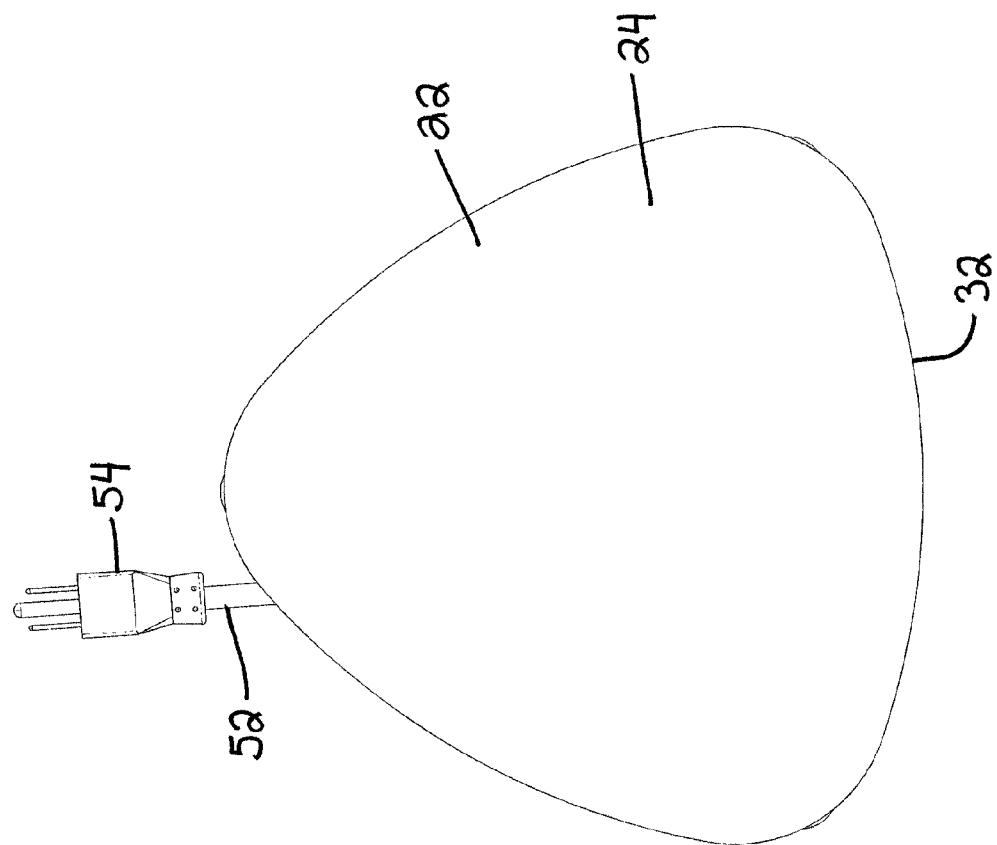
FIG. 4 is a top view thereof.

Referring to FIGS. 1-5, there is shown portable apparatus 10 for providing electrical power receptacles and device charging ports in accordance with one embodiment of the invention. Portable apparatus 10 comprises bottom panel member 12 which has top side 14 and bottom side 16. A plurality of feet members 18 are attached to bottom side 16 with fastening devices 19A that are located in bores or cavities 19B formed in feet members 18. Fastening devices 19A can be configured as screws, rivets, or any other suitable fastening device. Feet members 18 are fabricated from any suitable material such as rubber, neoprene rubber, resin, plastic, polyvinylchloride, etc. Feet members 18 are described in detail in the ensuing description.

Portable apparatus 10 further comprises wall structure 20 that is attached to top side 14 of bottom panel member 12. Portable apparatus 10 also includes top panel member 22. Top panel member 22 has top side 24 and bottom side 26. Wall structure 20 is attached to bottom side 26 of top panel member 22. Wall structure 20 is between bottom panel member 12 and top panel member 22. In a preferred embodiment, wall structure 20 is substantially perpendicular to bottom panel member 12 and substantially perpendicular to top panel member 22. Bottom panel member 12 is substantially parallel to top panel member 22. In one embodiment, top side 24 of top panel member 22 is substantially flat. Preferably, bottom panel member 12 and top panel member 22 have substantially the same shape and size. Therefore, bottom panel member 12 and top panel member 22 have substantially the same perimeter. Bottom panel member 12 has perimetrical edge 30 and top panel member 22 has perimetrical edge 32. In one embodiment, bottom panel member 12 and top panel member 22 are fabricated from metal, e.g. steel, aluminum, iron, etc. However, other suitable materials may be used, e.g. plastic, resin, etc.

Any suitable technique may be used to attach wall structure 20 to top side 14 of bottom panel member 12 and bottom side 26 of top panel member 22, such as screws, rivets or other fastening devices. In one embodiment, wall structure 20 is integrally formed with top panel member 22, and bottom panel member 12 is removably attached to wall structure 20. Wall structure 20 has a perimeter that is less than the perimeters of bottom panel member 12 and top panel member 22 so that wall structure 20 is off-set from perimetrical edges 30 and 32. Electrical power cable 52 includes plug portion 54 which is configured to be plugged into an AC power receptacle (e.g. 115-120 VAC). In one embodiment, electrical power cable 52 includes magnet 56 that is attached to plug portion 54. Magnet 56 can be magnetically attached to either bottom panel member 12 or top panel member 22. The purpose of magnet 56 is discussed in the ensuing description. Electrical power cable 52 further comprises electrical wires that are described in the ensuing description.

Figure 7:
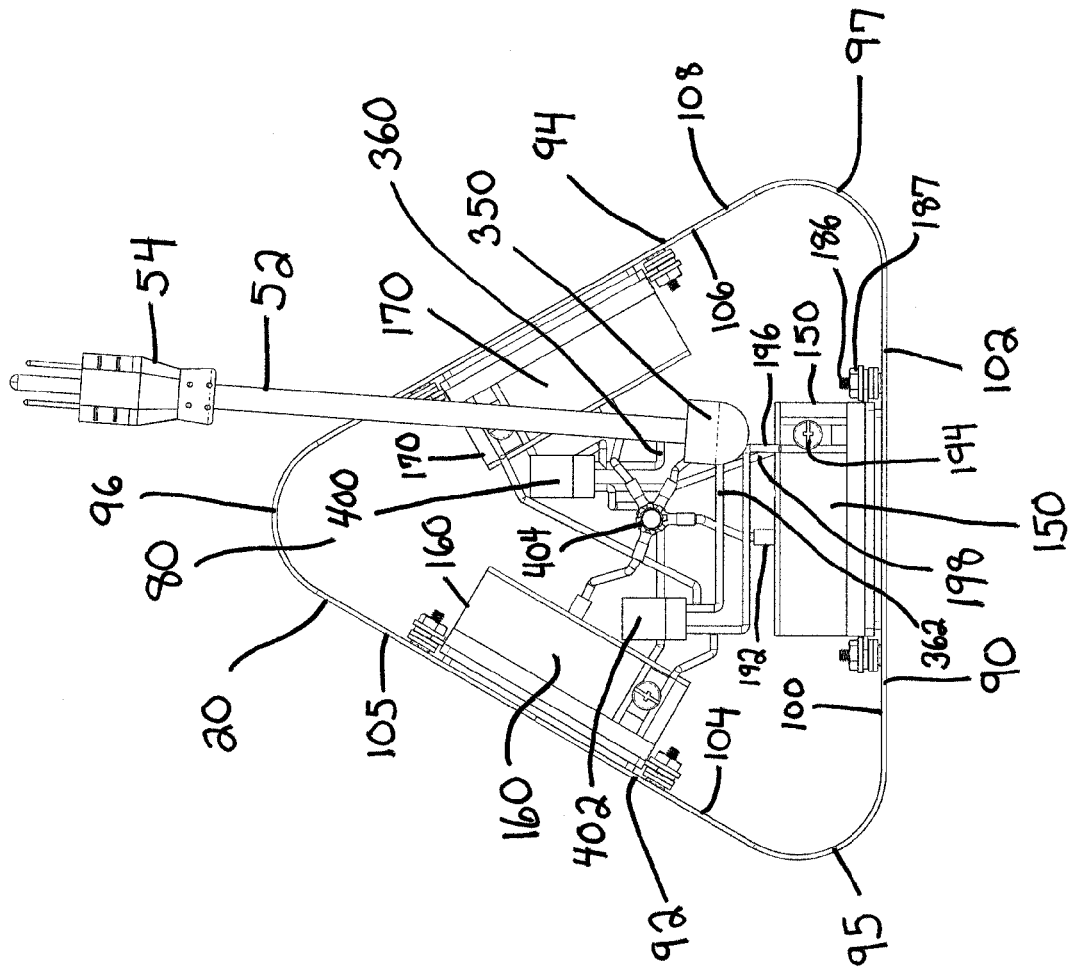
FIG. 7 is a bottom view of an interior region defined by the wall structure shown in FIGS. 1-3, the bottom panel member not being shown in order to facilitate viewing of the interior region.
Figure 8:
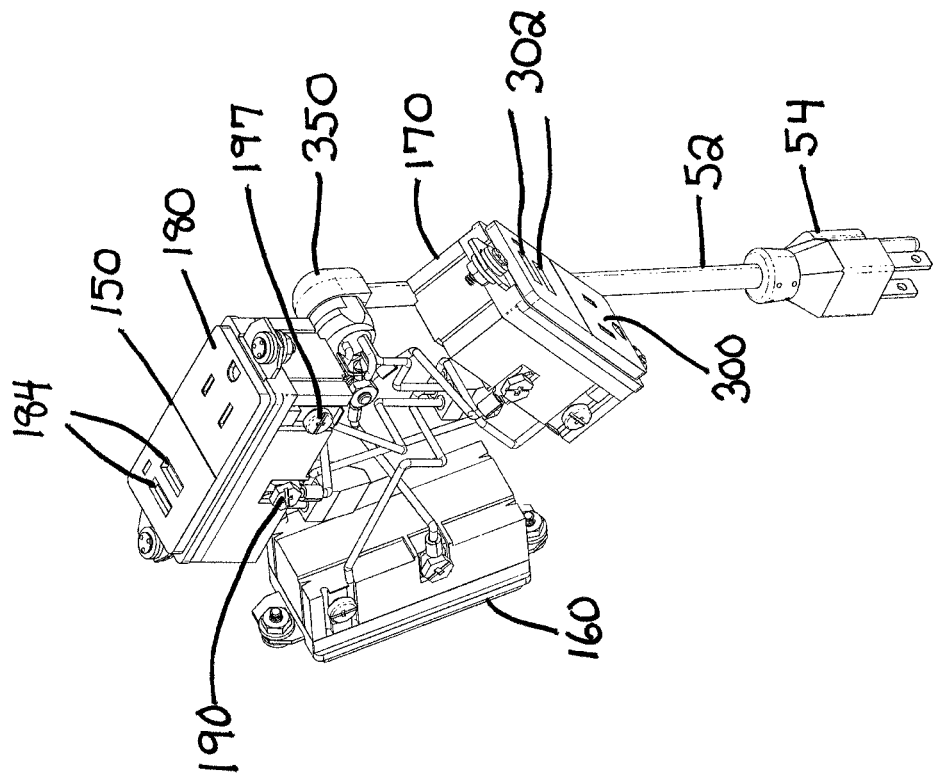
FIG. 8 is a diagram, in perspective, of the electrical power devices shown in FIG. 7, the electrical power devices being electrically connected to an electrical power cable.
Figure 9:
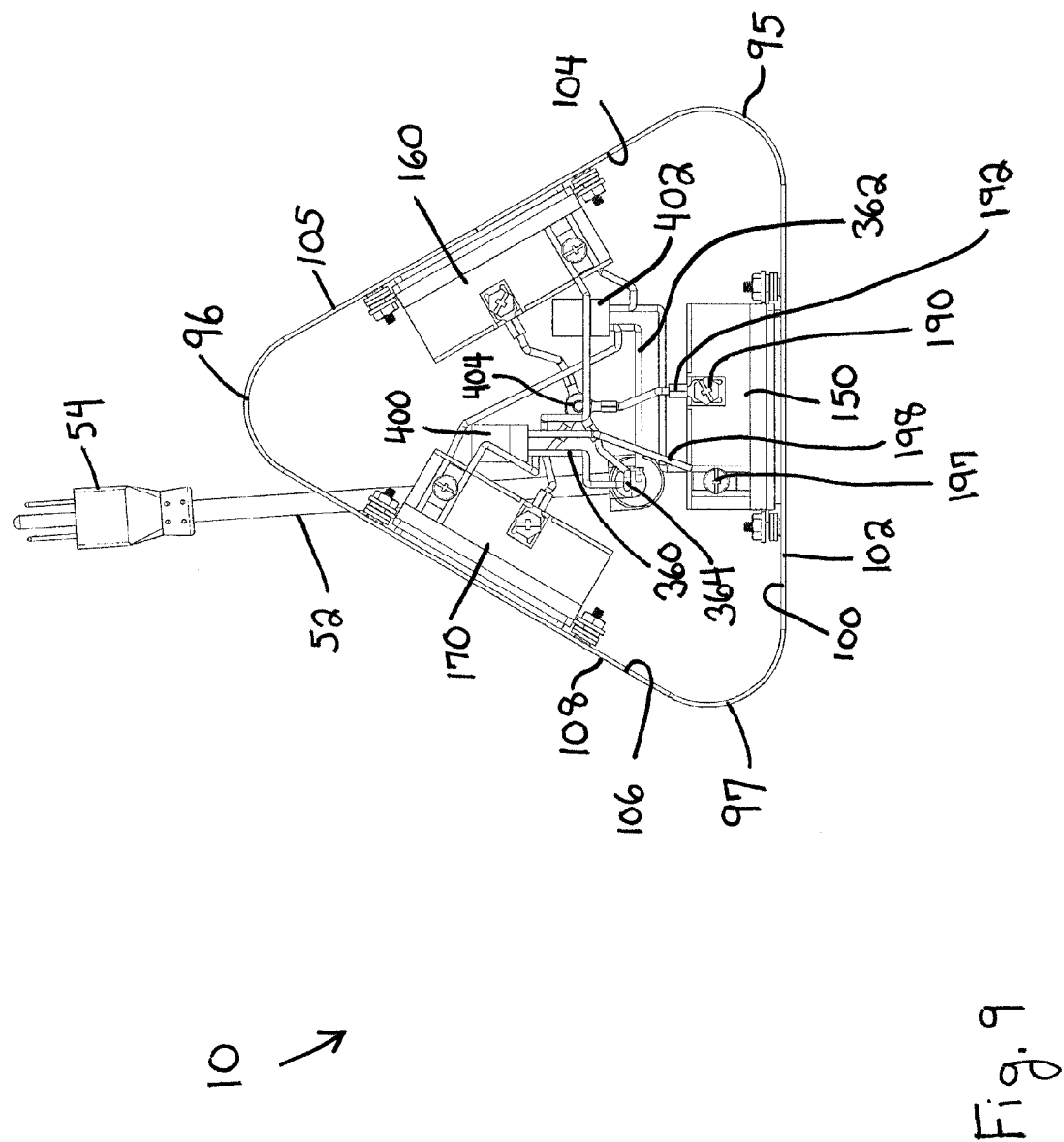
FIG. 9 is a top view of the interior region defined by the wall structure, the top panel member and bottom panel member not being shown so as to facilitate viewing of the interior region.
Figure 10:
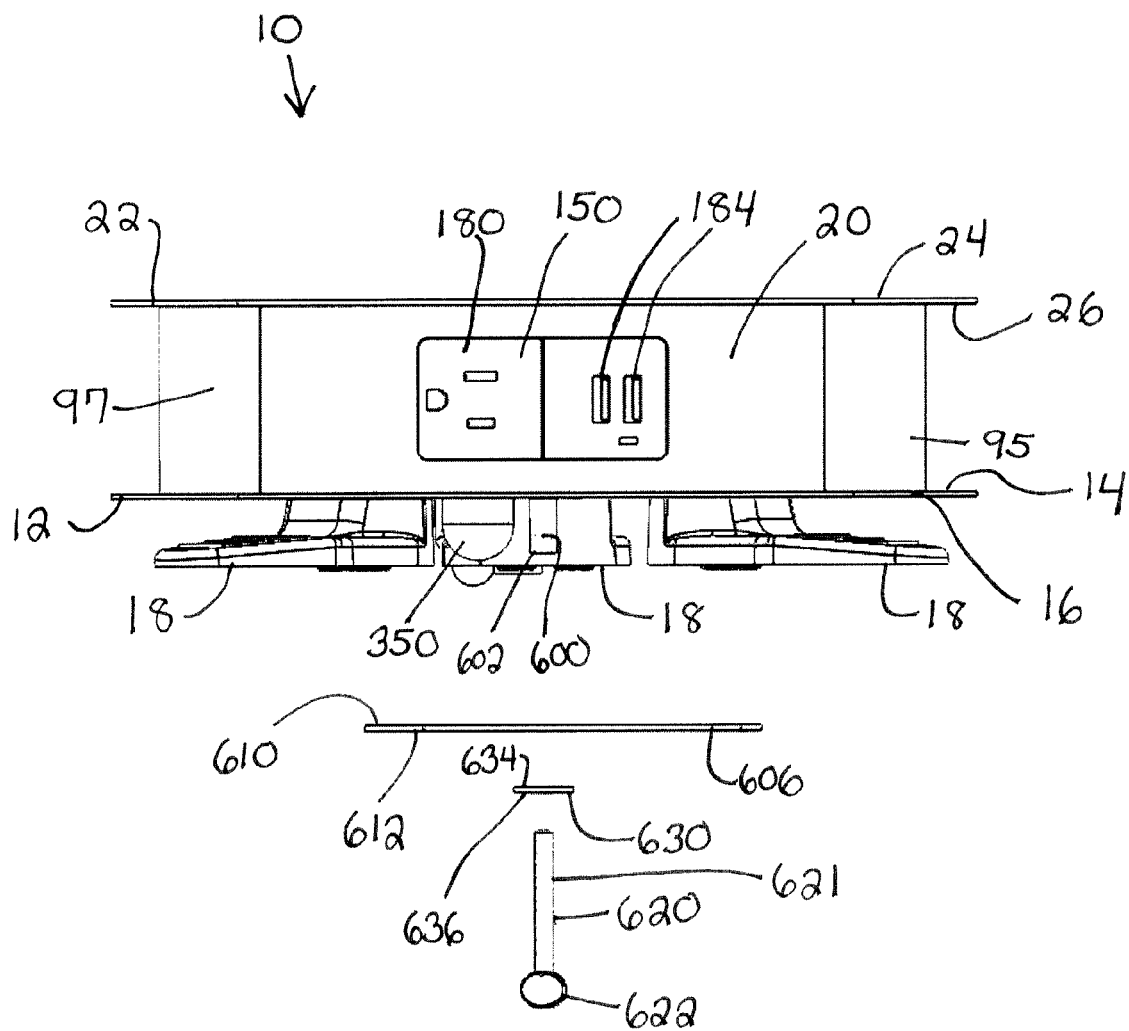
FIG. 10 is an exploded view, in elevation, of the portable apparatus configured with a clamping device to allow the portable apparatus to be removably attached to an article of furniture.
Figure 11:
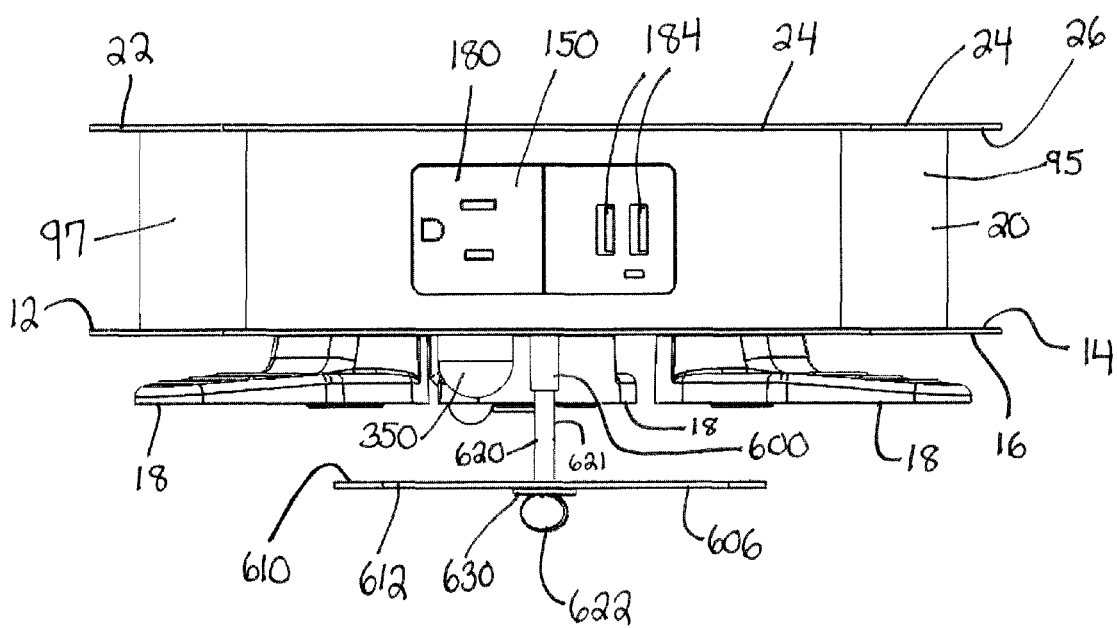
FIG. 11 is a side, elevational view showing components of the clamping device fastened together.

As shown in FIGS. 7-9, wall structure 20 defines interior region 80. FIG. 7 is a view looking through the bottom of portable apparatus 10 with bottom panel member 12 removed so as to facilitate viewing of interior region 80. Wall structure 20 comprises sections 90, 92 and 94. All sections 90, 92 and 94 have the same length. Wall section 20 has rounded or curved portions 95, 96 and 97. Section 90 is contiguous with rounded or curved portions 95 and 97. Section 92 is contiguous with rounded or curved portions 95 and 96. Section 94 is contiguous with rounded or curved portions 96 and 97. Section 90 has interior side 100 and exterior side 102. Section 92 has interior side 104 and exterior side 105. Similarly, section 94 has interior side 106 and exterior side 108. Portable apparatus 10 further comprises a plurality of identically constructed electrical power devices 150, 160 and 170. Electrical power device 150 is mounted to section 90 of wall structure 20 and comprises electrical power receptacle 180 and device charging ports 184. Electrical power receptacle 180 and device charging ports 184 protrude through a generally rectangular shaped opening in section 90. In a preferred embodiment, electrical power device 150 is removably attached to section 90 with a pair of fastener devices. In such an embodiment, each fastening device comprises a screw and nut, such as screw 186 and nut 187. In one embodiment, screw 186 is attached to interior side 100 of section 90. Electrical power device 150 comprises electrical contacts for the connection of electrical "hot", "neutral" and ground wires which are described in the ensuing description. In a preferred embodiment, electrical power receptacle 180 is configured to provide 110-120 VAC. However, it to be understood that electrical power device 150 may be configured so that electrical power receptacle 180 provides a different voltage. Electrical power device 150 comprises power conversion circuitry that converts 115-120 VAC to a relatively lower voltage that is provided at device charging ports 184. This relatively lower voltage is used to charge and power devices such as cell phones, smart phones, tablets, e-readers, digital recorders, cameras, iPads, iPods, MP3 players, etc. The devices to be charged, e.g. smart phone, are plugged into device charging ports 184. In a preferred embodiment, each device charging port 184 comprises a USB charging port. In one embodiment, electrical power device 150 is configured so that each device charging port 184 provides 5 VAC © 700 mA (milliamperes). However, it is to be understood that electrical power device 150 can be configured so that each device charging port 184 provides other voltage levels and currents. For example, in an alternate embodiment, each device charging port 184 is a USB charging port that provides 5 VAC © 500 mA. In one embodiment, each electrical power device 150, 160 and 170 is a commercially available Combination USB Charger With Tamper Resistant Receptacle-TR7740, manufactured by Cooper Wiring Devices of Peachtree City, Ga.

As shown in FIG. 8, electrical power device 150 has electrical contact 190 to which is connected electrical ground wire 192. Electrical power device 150 has electrical contact 194 to which is connected hot electrical wire 196. Electrical power device 150 also has an electrical contact 197 to which is connected neutral electrical wire 198. Referring to FIGS. 7-9, electrical power device 160 is removably attached to interior side 104 of section 92 of wall structure 20. Electrical power device 160 comprises electrical power receptacle 200 and device charging ports 202. Electrical power receptacle 200 and device charging ports 202 protrude through a generally rectangular shaped opening in section 92. Electrical power device 160 is removably attached to interior side 104 in the same way as electrical power device 150 is removably attached to interior wall 100. Electrical power device 160 is identical to electrical power device 150 and includes electrical contacts for the connection of electrical ground, "hot" and neutral wires. Electrical power device 170 is removably attached to interior side 106 of section 94 of wall structure 20 by the same technique used to removably attach electrical power devices 150 and 160 to interior sides 100 and 104, respectively. Electrical power device 170 is identical in construction to electrical power devices 150 and 160 and comprises electrical power receptacle 300 and device charging ports 302. Electrical power receptacle 300 and device charging ports 302 protrude through a generally rectangular shaped opening in section 94. Electrical power device 170 includes electrical contacts for the connection of electrical ground, "hot" and neutral wires.

Referring to FIGS. 6-9, electrical power cable 52 is secured to bottom panel member 12 by strain relief clamp 350. Plug portion 54 of electrical power cable 52 is configured to be plugged into an external electrical power receptacle (not shown) that provides between 110 and 120 VAC. In one embodiment, electrical power cable 52 is a three-wire, 14-gauge electrical power cable comprising "hot" electrical power wire 360, neutral electrical power wire 362 and electrical ground wire 364. Electrical wires 360, 362 and 364 extend into interior region 80. Electrical power wire 360 is electrically connected to electrical connector 400 which is located within interior region 80. Electrical wire 362 is electrically connected to electrical connector 402 which is located within interior region 80. Electrical ground wire 364 is electrically connected to electrical ground connector 404 which is located within interior region 80 and conductively connected to top side 14 of bottom panel member 12. All electrical "hot" wires that are electrically connected to electrical power devices 150, 160 and 170 are electrically connected to electrical connector 400. All electrical neutral wires that are electrically connected to electrical power devices 150, 160 and 170 are electrically connected to electrical connector 402. All electrical ground wires that are electrically connected to electrical power devices 150, 160 and 170 are electrically connected to electrical ground connector 404.

Referring to FIGS. 1, 2, 3 and 5, all feet members 18 are preferably identical in construction and shape and have body portion 500 and extending portion 502 that extends from body portion 500. Portion 502 is spaced apart from bottom side 16 of bottom panel member 12 such that space 504 exists between extending portion 502 and bottom side 16. Portion 502 has a plurality of ribs or ridges 506 formed thereon. When portable apparatus 10 is not in use, a user may wrap electrical power cord 52 around feet members 18 so that the electrical power cord 52 becomes positioned within the spaces 504. Ribs or ridges 506 prevent electrical power cable 52 from sliding off extending portions 502. Once electrical power cable 52 is completely wrapped around feet members 18, magnet 56 can be magnetically attached to either bottom panel member 12 or top panel member 22.

Figure 5:
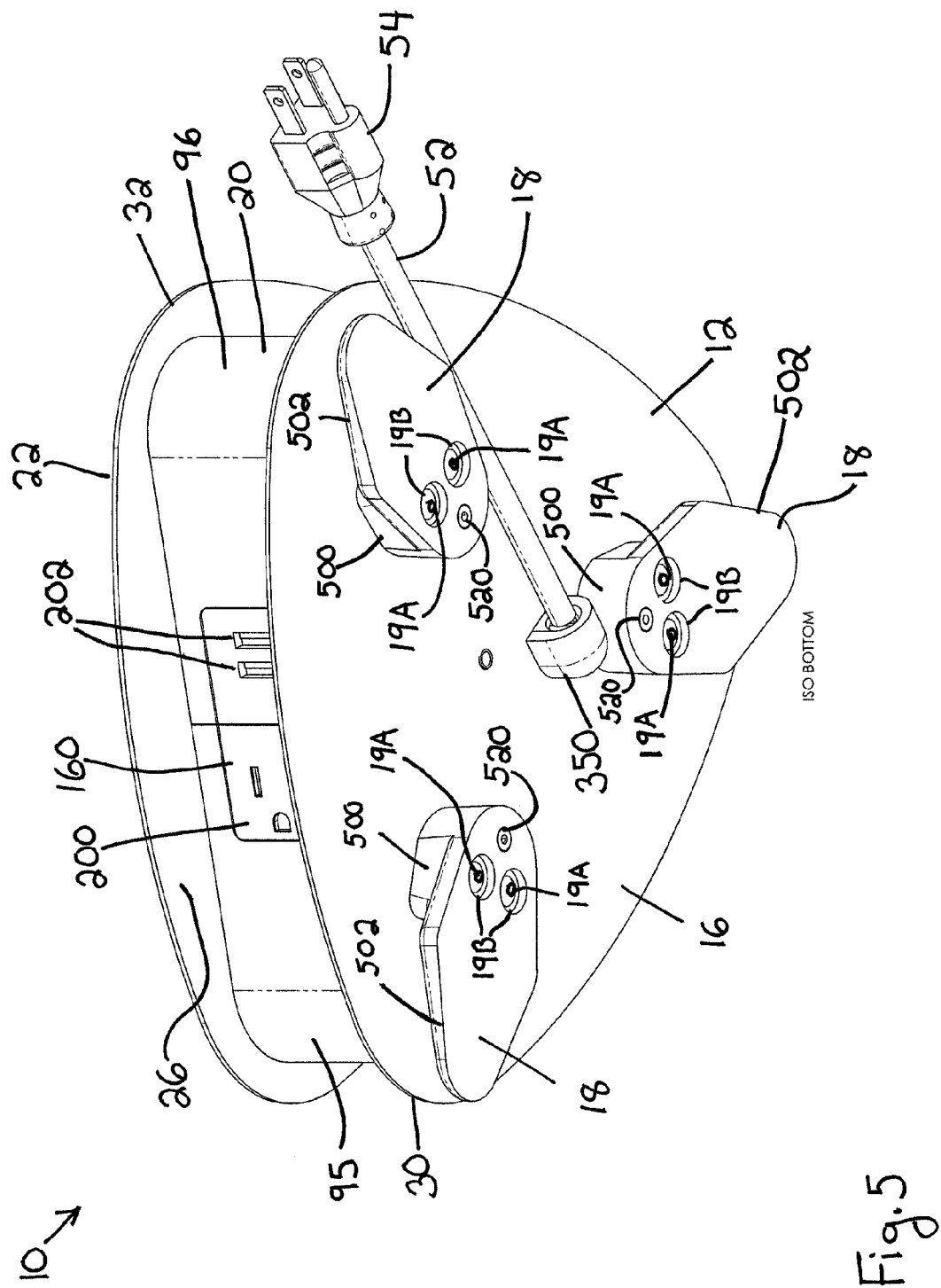
FIG. 5 is a bottom perspective view thereof.
Figure 6:
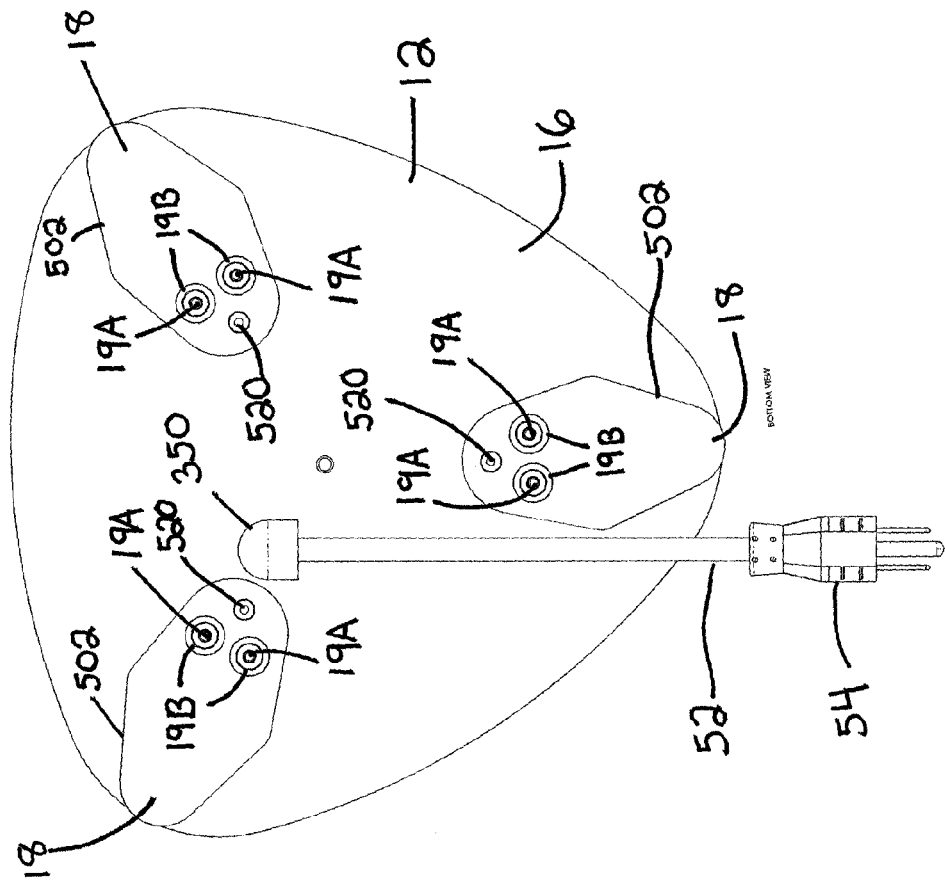
FIG. 6 is a bottom view thereof.

In one embodiment, all feet members 18 have a threaded nut 520 embedded therein (see FIGS. 5 and 6). Each threaded nut 520 is configured to receive a complementary screw (not shown). Such an embodiment provides a user with the option of using the threaded nuts 520 and the complementary screws (not shown) to removably attached portable apparatus 10 to an article of furniture such as a table, desk, work bench, work station, conference table, etc. In such an embodiment, the complementary screws are inserted through corresponding through-holes in the article of furniture and engaged with threaded nuts 520. In such an embodiment, the article of furniture has a through-hole sized to allow electrical power cable 52 to pass therethrough. In one embodiment, each threaded nut 520 is fabricated from brass. However, other suitable metals can be used to fabricate threaded nut 520.

In one embodiment, portable apparatus 10 is configured with a clamping device for removably attaching portable apparatus 10 to an article of furniture 700. Examples of an article of furniture include a work table, work bench, conference table, etc. Referring to FIGS. 10-19, the clamping device comprises fastener device 600 that is attached or joined to bottom panel member 12. Fastener device 600 is substantially perpendicular to bottom panel member 12 and has distal end 602 (see FIGS. 15 and 16). Any suitable method can be used to attach or join fastener device 600 to bottom panel 12. Fastener device 600 includes end 603 that is opposite distal end 602. End 603 is configured and sized to be pressed-fit through bottom panel member 12. In another embodiment, fastener device 600 is integral with bottom panel member 12. In a further embodiment, fastener device 600 is welded, spot welded or brazed to bottom panel member 12. In one embodiment, fastener device 600 is a self-clinching fastener. Fastener device 600 further includes threaded bore 604 (see FIGS. 15 and 16) and opening 605 at distal end 602 that provides access to threaded bore 604. The clamping device further comprises plate member 606 which has opening 608. In one embodiment, opening 608 is substantially centrally located. Plate member 606 has first side 610 for contacting bottom side 702 of article of furniture 700. Plate member 606 further comprises opposite, second side 612. First and second sides 610 and 612, respectively, are substantially flat. The clamping member further comprises threaded member 620. Threaded member 620 comprises shaft portion 621 which is threaded for its entire length. Shaft portion 621 is sized to be inserted through opening 608 in plate member 606. Shaft portion 621 is configured to be threadedly engaged with threaded bore 604 of fastener device 600. Shaft portion 621 has a diameter and a longitudinally extending axis. Threaded member 620 also includes head portion 622 that has a size that is relatively larger than the diameters of shaft portion 621 and opening 608 in plate member 606. Threaded member 620 may be configured as a thumb screw. In one embodiment, the clamping device includes washer member 630 that has central opening 632, first side 634 and opposite, second side 636. Central opening 632 has a diameter that is relatively smaller than the size of head portion 622. Washer member 630 is positioned between plate member 606 and head portion 622 and shaft portion 621 is disposed through central opening 632.

Figure 12:
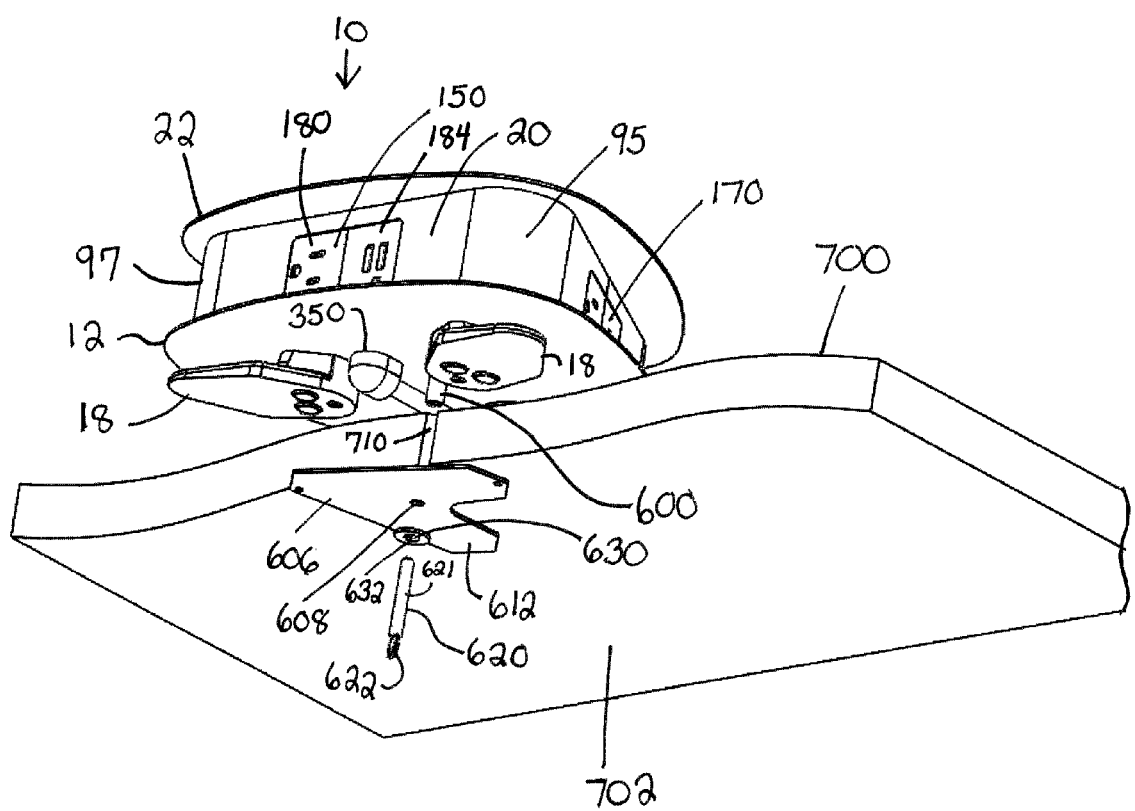
FIG. 12 is a perspective view showing the portable apparatus of FIG. 10 being mounted to an article of furniture using the clamping device.
Figure 13:
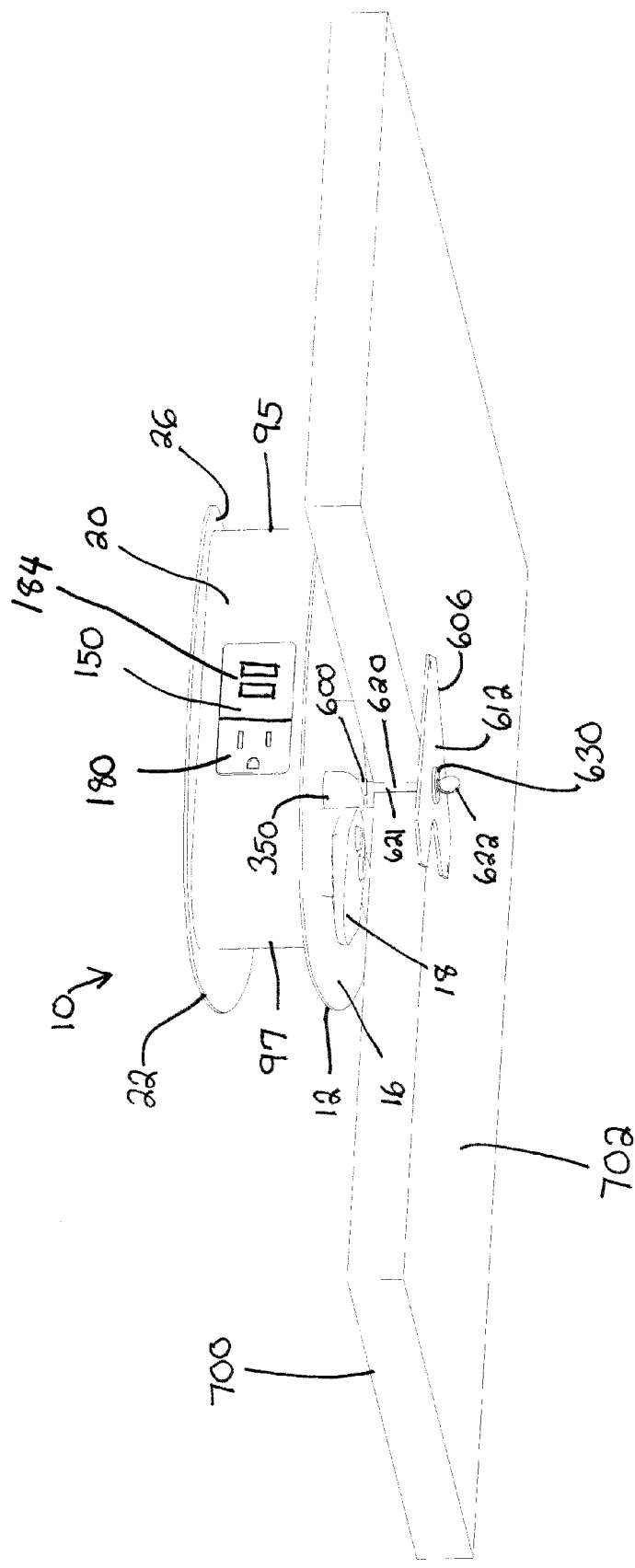
FIGS. 13 and 14 are perspective views showing the portable apparatus mounted to the article of furniture using the clamping device, the view showing a portion of the article of furniture cut-away so as to facilitate viewing of the components of the clamping device.
Figure 14:
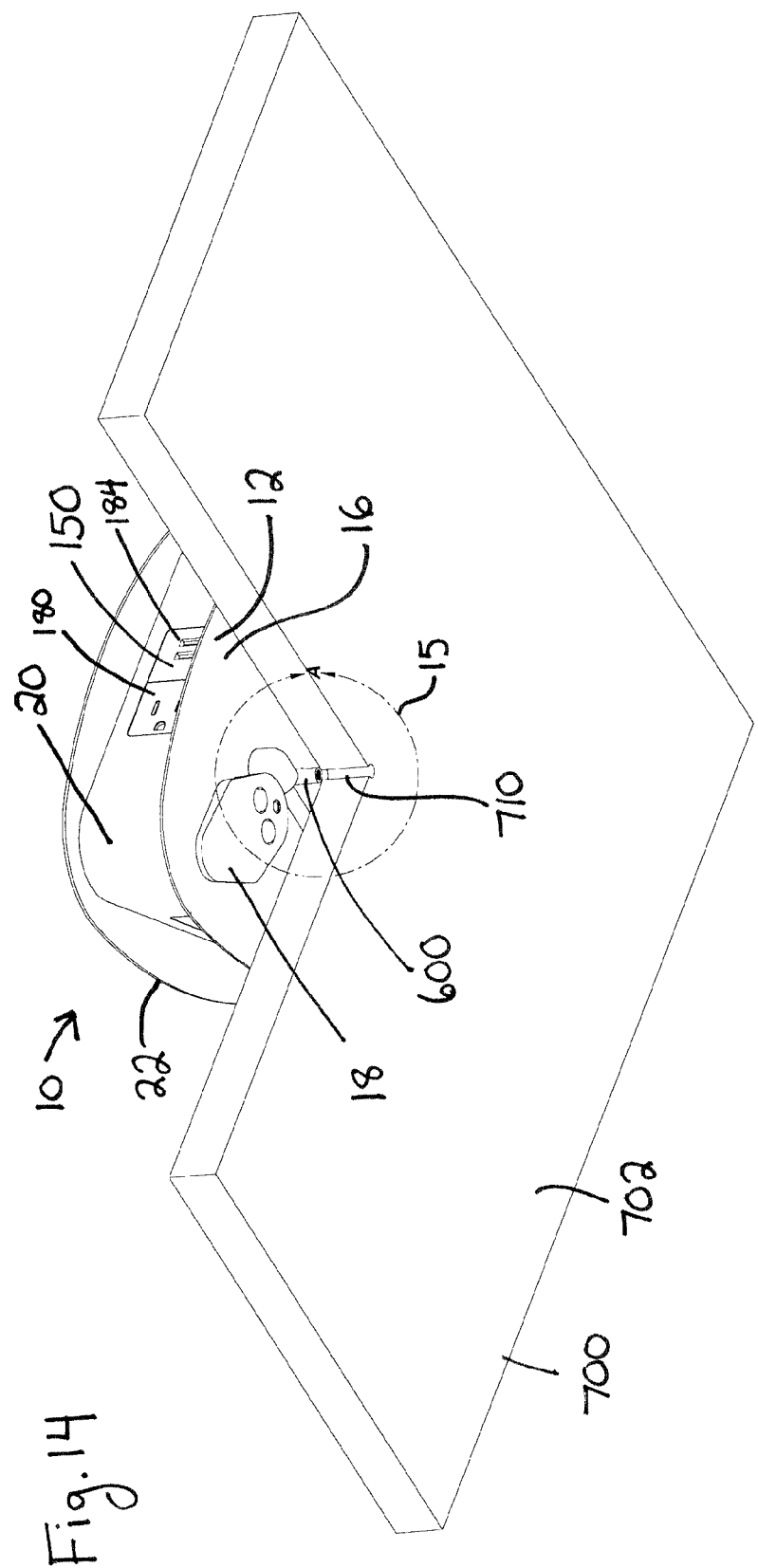
Figure 15:
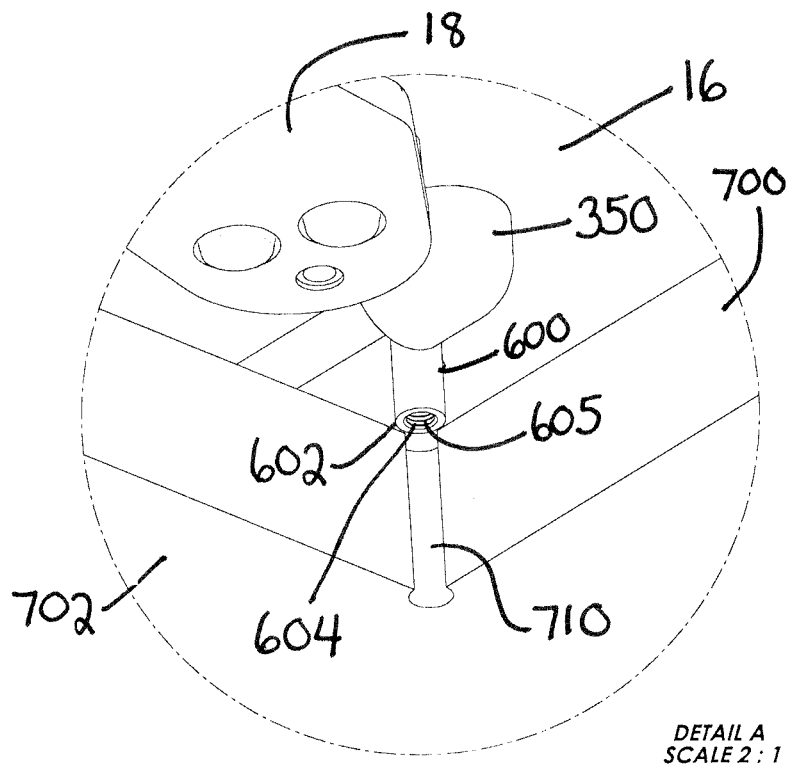
FIG. 15 is an enlarged view of a portion of the view shown in FIG. 14.

In order to clamp portable apparatus 10 to article furniture 700, a user first drills a through-hole 710 through the article of furniture 700 (see FIGS. 12 and 15). Through-hole 710 must be sized to receive shaft portion 621 of threaded member 620. Next, the user positions portable apparatus 10 over through-hole 710 so that opening 605 is aligned with through-hole 710. The user then inserts shaft portion 621 through central opening 632 of washer member 630 and through opening 608 of plate member 606 and into through-hole 710 and into opening 605 of fastener device 600. The user then uses head portion 622 to screw shaft portion 621 into threaded bore 604 of fastener device 600 until first side 610 of plate member 606 is firmly pressed against bottom side 702 of article furniture 700. When first side 610 of plate member 606 firmly contacts and presses against bottom side 702, first side 634 of washer member 630 also firmly contacts and presses against second side 612 of plate member 606 and head portion 622 firmly contacts and presses against second side 636 of washer member 630. The thickness of article of furniture 700 will determine how long the user will have to continue to screw shaft portion 621 into threaded bore 604. Portable apparatus 10 is now firmly attached to article of furniture 700.

Portable apparatus 10 is relatively light in weight and can be conveniently placed on desks, conference tables, work stations, work benches, etc. Portable apparatus 10 can be configured to have any suitable size. In one embodiment, portable apparatus 10 is configured so that bottom panel member 12 and top panel member 22 each have a diameter of about nine (9) inches. In one embodiment, portable apparatus 10 has a height of three (3) inches.

In an alternate embodiment, portable apparatus 10 can be configured so that wall structure 20 has more than three sections. For example, wall structure 20 may be configured to have four sections that are arranged as a square. It is preferred that in such embodiments, the wall structure is offset from the perimetrical edges of the top panel member and bottom panel member.

Any suitable materials may be used to fabricate portable apparatus 10 or portions thereof. Such materials include metals, composite materials, plastics, resins, etc.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:
1. A portable apparatus for providing electrical power receptacles and device charging ports, comprising:
   a bottom panel member having a top side, a bottom side and
      a through-hole for receiving an electrical power cable;

a wall structure attached and substantially perpendicular to the top side of the bottom panel member, the wall structure defining an interior region and comprising a plurality of sections wherein each section has an opening therein;

a plurality of electrical power devices located within the interior region defined by the wall structure, wherein each electrical power device is attached to a corresponding section of the wall structure, each electrical power device comprising an electrical power receptacle and at least one device charging port which are positioned within the opening in the corresponding section of the wall structure;

a top panel member positioned over the wall structure so as to cover the interior region defined by the wall structure, the top panel member having a top side and a bottom side, wherein the wall structure is attached to bottom side of the top panel member; and an electrical power cable having a first portion that extends through the through-hole in the bottom panel member and is electrically connected to all of the electrical power devices, and a second portion that is configured for connection to an electrical power source.

2. The portable apparatus according to claim 1 wherein the plurality of sections of the wall structure comprises three sections.

3. The portable apparatus according to claim 2 wherein each opening in each section of the wall structure is generally rectangular in shape.

4. The portable apparatus according to claim 1 wherein bottom panel member has a first predetermined perimeter and a perimetrical edge and wherein the wall structure has a second predetermined perimeter that is less than the first predetermined perimeter such that the wall structure is offset from the first perimetrical edge of the bottom panel member.

5. The portable apparatus according to claim 4 wherein the top panel member has a third predetermined perimeter and a perimetrical edge, wherein the third predetermined perimeter is substantially the same as the first predetermined perimeter and the wall structure is offset from the perimetrical edge of the top panel member.

6. The portable apparatus according to claim 1 further comprising a plurality of feet members attached to the bottom side of the bottom panel member.

7. The portable apparatus according to claim 1 wherein the at least one device charging port comprises a USB charging port.

8. The portable apparatus according to claim 1 wherein the at least one electrical power receptacle comprises an AC power receptacle.

9. The portable apparatus according to claim 1 wherein the electrical power device comprises an input for receiving a first electrical voltage at a first electrical current and conversion circuitry that converts the first voltage to a second voltage at a second electrical current, wherein the second electrical voltage and second electrical current is less than the first electrical voltage and the first electrical current, respectively.

10. The portable apparatus according to claim 1 wherein the top side of the top panel member is substantially flat.

11. The portable apparatus according to claim 1 further comprises a plurality of feet members attached to the bottom side of the bottom panel member.

12. The portable apparatus according to claim 11 wherein all of the feet members have bottom surfaces for contacting a work surface and wherein all of the feet members include a body portion and an extending portion that extends from the body portion, wherein the extending portion is spaced apart from the bottom side of the bottom panel member so as to provide a space, wherein the spaces between each extending portion and the bottom side of the bottom panel member allow the electrical power cable to be wrapped around all of the feet members and positioned within the spaces.

13. The portable apparatus according to claim 12 wherein each extending portion has a plurality of ribs thereon to prevent the electrical power cable from sliding off the extending portions.

14. The portable apparatus according to claim 12 wherein all of the feet members have a threaded nut embedded in the bottom surface, wherein the threaded nuts confront the work surface when the portable apparatus is positioned on the work surface, wherein each threaded nut is configured to be engaged with a complementary screw.

15. The portable apparatus according to claim 12 further comprising means for removably attaching the portable apparatus to a work surface.

16. The portable apparatus according to claim 1 further comprising a clamping device for removably attaching the portable apparatus to an article of furniture, the clamping device comprising:

a fastener device attached to the bottom panel member, the fastener device being substantially vertically oriented and having a distal end, the fastener device including a longitudinally extending axis, a threaded bore extending along the longitudinally extending axis, and an opening at the distal end that provides access to the threaded bore;

a plate member having an opening therethrough, the plate member being configured to contact a bottom side of the article of furniture; and a threaded member comprising a head portion and a shaft portion, the shaft portion having a diameter and being sized for insertion through the opening in the plate member and threadedly engaged with the threaded bore of the fastener device, the head portion having a size that is relatively larger than the diameters of the shaft member and the opening in the plate member.

17. The portable apparatus according to claim 16 wherein the clamping device further comprises a washer member having an opening that has a diameter that is relatively smaller than the size of the head portion, the shaft portion being disposed through the opening of the washer member, wherein the washer member is positioned between the plate member and the head portion of the threaded member.

18. The portable apparatus according to claim 17 wherein the plate member has a first side for contacting the bottom side of the article of furniture and an opposite, second side for contacting the washer member, the first and second sides being substantially flat.

* * * * *